United States Patent
Inoue et al.

(10) Patent No.: US 10,673,212 B2
(45) Date of Patent: Jun. 2, 2020

(54) SWITCHGEAR (71) Applicant: MITSUBISHI ELECTRIC CORPORATION, Chiyoda-ku, Tokyo (JP)

(72) Inventors: Naoaki Inoue, Tokyo (JP); Koji Sano, Tokyo (JP); Masahiro Arioka, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 9 days.

(21) Appl. No.: 15/534,363

(22) PCT Filed: Dec. 11, 2014

(86) PCT No.: PCT/JP2014/082791
§ 371 (c)(1),
(2) Date: Jun. 8, 2017

(87) PCT Pub. No.: WO2016/092659
PCT Pub. Date: Jun. 16, 2016

(65) Prior Publication Data
US 2017/0346263 A1 Nov. 30, 2017

(51) Int. Cl.
*H02B 1/22* (2006.01)
*H02B 1/24* (2006.01)
(Continued)

(52) U.S. Cl.
CPC ........... *H02B 13/0352* (2013.01); *H02B 1/22* (2013.01); *H02B 1/24* (2013.01); *H02B 1/306* (2013.01);
(Continued)

(58) Field of Classification Search
None
See application file for complete search history.

(56) References Cited

U.S. PATENT DOCUMENTS 2,349,645 A * 5/1944 Young .................... G01R 11/04
361/660
3,628,097 A * 12/1971 Kobryner ............... G01R 11/04
361/659
(Continued)

FOREIGN PATENT DOCUMENTS

CN 2241929 Y 12/1996
CN 201126938 Y 10/2008
(Continued)

OTHER PUBLICATIONS

International Search Report (PCT/ISA/210) dated Jan. 13, 2015, by the Japanese Patent Office as the International Searching Authority for International Application No. PCT/JP2014/082791.
(Continued)

Primary Examiner — Courtney L Smith
(74) Attorney, Agent, or Firm — Buchanan Ingersoll & Rooney PC (57) ABSTRACT

A switchgear according to the present invention includes a disconnecting unit that includes multiple switches to switch electrical paths by rotation of blades, and a switch housing having a view port, and including the switches arranged therein, wherein planes of rotation of the blades and an arrangement direction of the switches intersect, and the switches are arranged rearward from the view port.

17 Claims, 6 Drawing Sheets (51) Int. Cl.
  *H02B 13/035* (2006.01)
  *H02B 1/30* (2006.01)
  *H01H 9/02* (2006.01)
  *H01H 31/00* (2006.01)

(52) U.S. Cl.
  CPC ... *H01H 31/003* (2013.01); *H01H 2009/0292* (2013.01); *H02B 13/0356* (2013.01); *H02B 13/0358* (2013.01)

(56) References Cited

U.S. PATENT DOCUMENTS

| | | | | |
|---|---|---|---|---|
| 3,707,653 | A * | 12/1972 | Coffey | H02B 1/03 174/66 |
| 4,112,249 | A * | 9/1978 | Carlson | H02G 5/007 174/68.2 |
| 4,413,306 | A * | 11/1983 | Erickson | H02B 1/06 361/644 |
| 5,936,834 | A * | 8/1999 | Polston | H02B 1/20 361/660 |
| 7,400,495 | B1 * | 7/2008 | Ranta | G01R 11/24 361/660 |
| 7,515,398 | B2 * | 4/2009 | Takao | H02B 5/06 218/75 |
| 7,675,738 | B2 * | 3/2010 | Fukunaga | H02B 13/0352 218/10 |
| 8,228,665 | B2 * | 7/2012 | Fujita | H02B 5/06 218/10 |
| 8,243,423 | B2 * | 8/2012 | Ranta | G01R 11/02 361/660 |
| 2009/0015991 | A1 | 1/2009 | Hyrenbach et al. | |
| 2009/0251852 | A1 * | 10/2009 | Zhang | H02B 1/03 361/660 |
| 2013/0163165 | A1 | 6/2013 | Hyrenbach et al. | |
| 2017/0125992 | A1 * | 5/2017 | Wiertek | H01B 17/26 |

FOREIGN PATENT DOCUMENTS

| | | |
|---|---|---|
| CN | 203119377 U | 8/2013 |
| EP | 1463174 A1 | 9/2004 |
| FR | 2628258 A1 | 9/1989 |
| JP | 60-128414 U | 8/1985 |
| JP | 06-311614 A | 11/1994 |
| JP | 2009-081910 A | 4/2009 |
| WO | WO 00/69041 A1 | 11/2000 |
| WO | 2005/122352 A1 | 12/2005 |
| WO | 2011/020512 A1 | 2/2011 |

OTHER PUBLICATIONS

Written Opinion (PCT/ISA/237) dated Jan. 13, 2015, by the Japanese Patent Office as the International Searching Authority for International Application No. PCT/JP2014/082791.
Extended European Search Report dated Jun. 14, 2018, issued by the European Patent Office in corresponding European Application No. 14907712.5. (9 pages).
First Office Action dated Apr. 18, 2018, issued in corresponding Chinese Patent Application No. 201480083846.4, and an English translation thereof.
Office Action dated Nov. 14, 2018, by the Chinese Patent Office in corresponding Chinese Patent Application No. 201480083846.4 and English translation of the Office Action. (12 pages).
Office Action dated May 7, 2019, by the Chinese Patent Office in corresponding Chinese Patent Application No. 201480083846.4 and English translation of the Office Action. (11 pages).
Chinese Office Action and English Translation issued in corresponding Chinese Application No. 201480083846.4 dated Feb. 7, 2020 (15 pages).
European Office Action issued in corresponding European Application No. 14907712.5 dated Mar. 23, 2020, 7 pages.

* cited by examiner

SWITCHGEAR

TECHNICAL FIELD

The present invention relates to a switchgear.

BACKGROUND ART

A switchgear generally adopts a double busbar structure to have redundancy, and when failure occurs, one busbar is cut-off and operation is continued with the other busbar. In such a double busbar structure, two sets of three-phase busbars are arranged one by one on a front side and a rear side of the switch gear. In this case, a busbar disconnector for a set of three-phase busbars on the front side is operated from the front side of the switchgear, and a busbar disconnector for a set of three-phase busbars on the rear side is operated from the back side of the switchgear (for example, Patent Documents 1 and 2).

PRIOR ART DOCUMENTS

Patent Documents

Patent Document 1: Japanese Unexamined Patent Publication No. H6-311614
Patent Document 2: Japanese Unexamined Patent Publication No. 2009-81910

SUMMARY OF INVENTION

Technical Problem

In a switchgear configured with such a conventional double busbar structure, because the two busbar disconnectors are operated from the front side and the back side thereof, the operations cannot be performed at a time, and this leads to lower operability.

In a case where two sets of the three-phase busbar disconnectors are arranged one above the other in the vertical direction in the switchgear, the height of the switchgear increases. In a case where the busbar disconnectors are disposed in an anteroposterior direction, the width of the switchgear increases.

Furthermore, in a case where disconnectors with rotating blades, for example, three-position switches, which are blade-type disconnecting/earthing switches, are used as three-phase busbar disconnectors, the three-position switches need to be disposed with wide spaces therebetween to prevent their mutual interference. This leads to difficulty in downsizing of a switch housing containing the three-phase three-position switches, requiring a large installation space for the disconnectors including the switch housing, and making it difficult to install the switchgear in a narrow place.

The present invention is made to solve such problems, and aims to downsize a switchgear, in which a disconnecting unit with a switch housing containing three-phase switches are disposed, in height and anteroposterior directions, and to enable installation of the switchgear in a narrow place.

Solution to Problem

A switchgear according to the present invention includes a disconnecting unit that includes multiple switches to switch electrical paths by rotation of blades, and a switch housing having a view port, and including the switches arranged therein, wherein planes of rotation of the blades and an arrangement direction of the switches intersect, the switches are arranged rearward from the view port, and the blades of the switches is individually visible through the view port.

Advantageous Effects of Invention

The switchgear according to the invention does not cause interference of the blades between adjacent switches with the blades; this enables reduction in intervals between the switches, and downsizing of the switchgear. In addition, the blades can be observed through the view port on a front side of the switchgear; this eliminates the need for allocating an observation space on a lateral side or the like, enabling installation in a narrow space.

DESCRIPTION OF EMBODIMENTS

Embodiment 1

Figure 1:
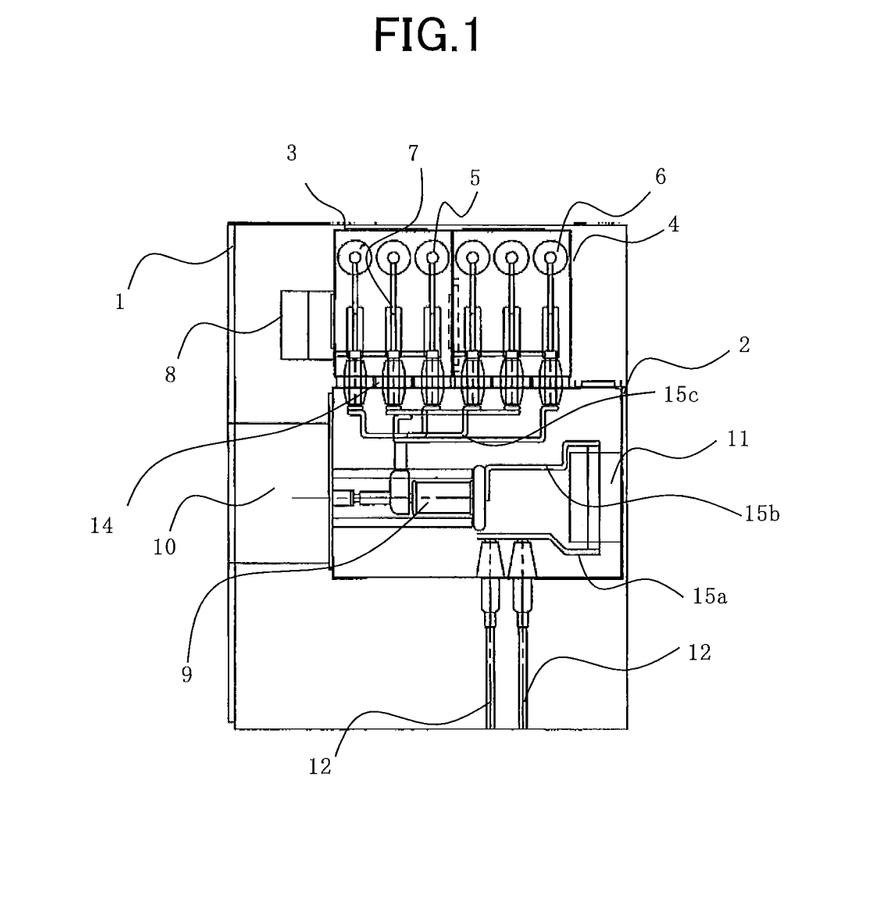
FIG. 1 is a side cross-sectional view of a switchgear according to Embodiment 1 of the invention.
Figure 2:
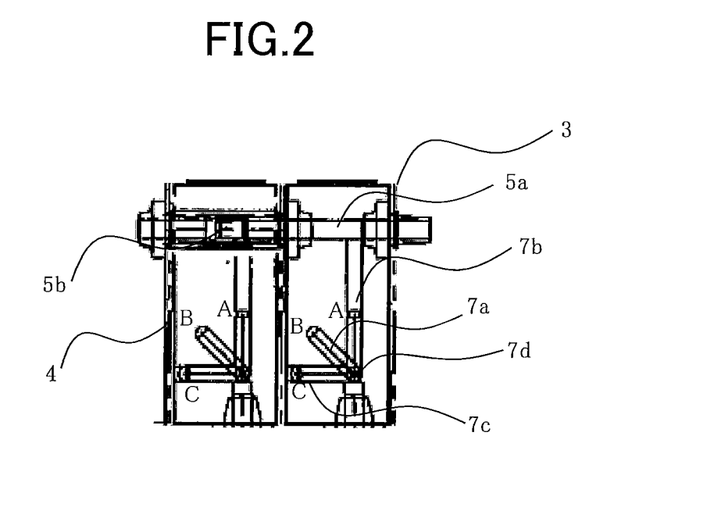
FIG. 2 is a front cross-sectional view of a disconnecting unit of the switchgear according to Embodiment 1 of the invention.
Figure 3:
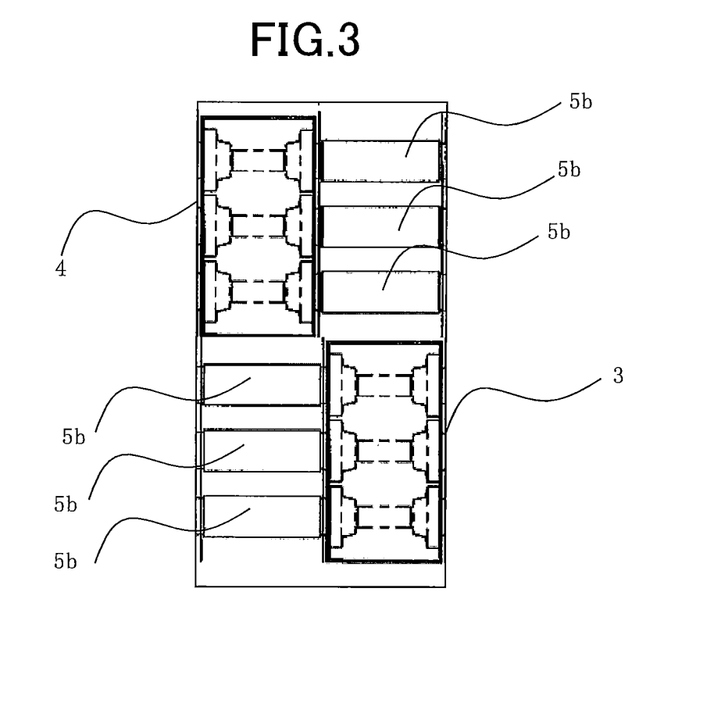
FIG. 3 is a top cross-sectional view of the switchgear according to Embodiment 1 of the invention.
Figure 4:
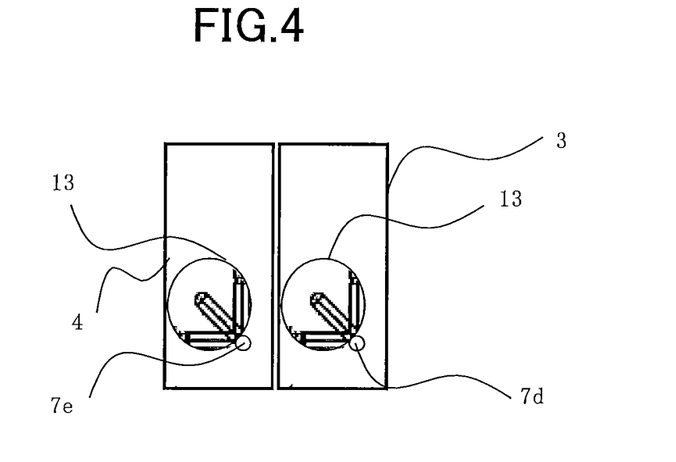
FIG. 4 is a front view of the disconnecting unit of the switchgear according to Embodiment 1 of the invention.
Figure 5:
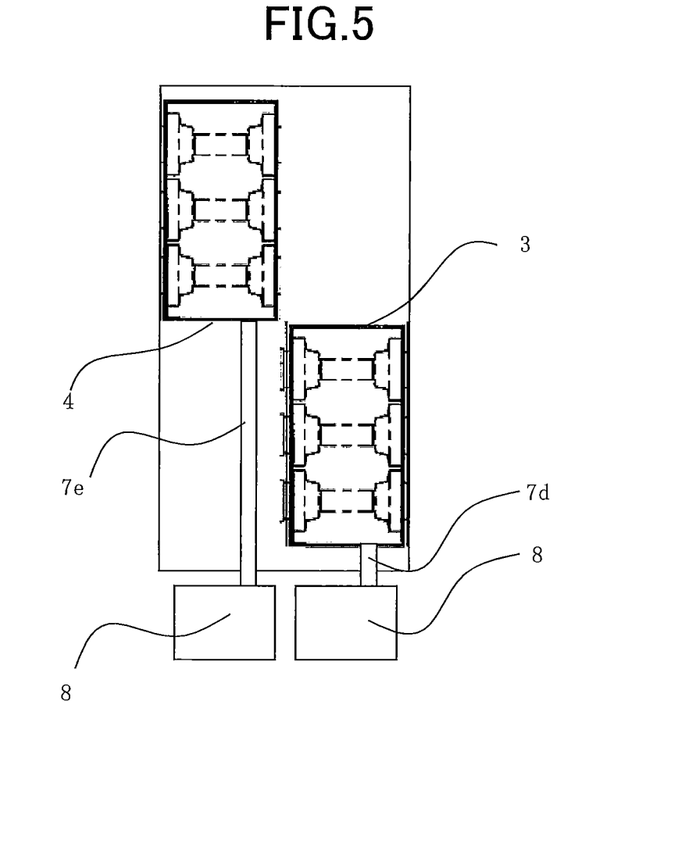
FIG. 5 is a top cross-sectional view showing operation mechanisms of switches of the switchgear according to Embodiment 1 of the invention.

A configuration of a switchgear 1 according to Embodiment 1 is explained with reference to FIGS. 1 to 5. FIG. 1 is a cross-sectional view showing an internal structure of the switchgear 1 according to Embodiment 1 observed from a lateral side thereof. FIG. 2 is a cross-sectional view showing internal structures of a first busbar disconnecting unit 3 and a second busbar disconnecting unit 4, observed from the front thereof, which constitute disconnecting units of the switchgear 1 and have switches 7 arranged therein. FIG. 3 is a cross-sectional view showing busbar connection parts 5*b* of the switchgear 1 observed from the top. FIG. 4 is a drawing showing the first busbar disconnecting unit 3 and the second busbar disconnecting unit 4 shown in FIG. 2 observed from the front. FIG. 5 is a top cross-sectional view showing operation mechanisms of three-position switches 7.

A disconnecting unit according to the present embodiment includes a switch housing in which switches with blades are arranged. Among such disconnecting units, a disconnecting unit including a switch connected particularly to a busbar is referred to as a busbar disconnecting unit.

Although a three-position switch is shown as an example, any switch with a blade serves as the switch. A three-position switch 7, also referred to as a blade-type disconnector/earthing switch, is a device to switch an electric path between opening, closing, and grounding by rotation of the blade. In the embodiment, the switch is installed in the bus disconnecting unit to switch the busbar between opening, closing, and grounding.

First, a configuration of the switchgear 1 according to Embodiment 1 is explained with reference to FIG. 1. FIG. 1 shows an internal structure of the switchgear 1 observed from a side thereof. There are disposed, from the lower part of the switchgear, three power cables 12 for three phases (FIG. 1 shows two of them that are visible at a time), a circuit breaker unit 2 including circuit breakers 9 disposed in a circuit breaker housing, and the first busbar disconnecting unit 3 and the second busbar disconnecting unit 4. A circuit breaker operation mechanism 10 is installed on the front side of the circuit breaker unit 2, and operation mechanisms 8 of three-position switches 7 are installed on the front side of the first busbar disconnecting unit 3.

Main circuit paths of the circuit breaker unit 2 are made by connecting the power cables 12 to the circuit breakers 9 via conductors 15a, current transformers 11, and conductors 15b of the circuit breakers 9, and further connecting the circuit breakers 9 to partition bushings 14 via conductors 15c.

In the circuit breaker unit 2, six partition bushings 14 are disposed; three of them on the front side are connected to the first busbar disconnecting unit 3 located on the front side, and three of them on the rear side are connected to the second busbar disconnecting unit 4 located on the rear side.

In the first busbar disconnecting unit 3, three-position switches 7 and first busbars 5 are disposed, and in the second busbar disconnecting unit 4, three-position switches 7 and second busbars 6 are disposed. Main circuits of the first busbar disconnecting unit 3 are made by connecting partition bushings 14 to the first busbars 5 via three-position switches 7, and main circuits of the second busbar disconnecting unit 4 are made by connecting partition bushings 14 to the second busbars 6 via three-position switches 7.

FIG. 2 is a cross-sectional view, observed from the front side of the switchgear 1, showing internal structures of the first busbar disconnecting unit 3 and the second busbar disconnecting unit 4, in which three three-position switches 7 for respective three phases of the busbars are arranged. It shows positions (connection A, cutoff (disconnection) B, and connection (earthing) C) of a blade 7a of a three-position switch 7 for each of busbars 5a. FIG. 3 shows the first busbar disconnecting unit 3 and the second busbar disconnecting unit 4 of the switchgear 1 viewed from the top side thereof, and shows a state in which the busbar connection parts 5b are arranged.

The lower side of FIG. 3 corresponds to the front side of the switch gear 1. As shown in FIGS. 2 and 3, the first busbar disconnecting unit 3 on the right side is disposed on the front side of the switchgear 1, and the second busbar disconnecting unit 4 on the left side is disposed on the back side of the switchgear.

The blade 7a constituting an opening/closing portion of the three-position switch 7 rotates in a plane perpendicular to an observation direction to switch an electrical path. Specifically, the blade 7a pivots about an operation shaft 7d and connects to the connection terminal 7b (A), whereby the three-position switch 7 turns into a closed state. When it is connected to an earthing terminal 7c (C), the three-position switch 7 turns into an earthing state. When the blade 7a is in a position (B) other than the above, the three-position switch 7 turns into an open state.

As shown in FIGS. 2 and 3, the first busbar disconnecting unit 3 and the second busbar disconnecting unit 4 each have three three-position switches 7, which are arranged rearward from the front side of the switchgear 1. As described above, the blade 7a of each three-position switch 7 rotates in a plane orthogonal to the direction in which three-position switches 7 are arranged rearward from the front side. In other words, viewed from the front side of the disconnecting unit, the blade 7a rotates in clockwise or counterclockwise directions. Thus, blades 7a of adjacent three-position switches 7 do not interfere with each other. This arrangement enables narrow spaced and dense disposition of the three-position switches 7 in the first busbar disconnecting unit 3 and the second busbar disconnecting unit 4, leading to downsizing of the first busbar disconnecting unit 3 and the second busbar disconnecting unit 4.

In the embodiment, an example is shown in which a plane of rotation of a blade 7a is orthogonal to the arrangement direction of the three-position switches 7. However, the angle may not be orthogonal as long as the blades 7a of the three-position switches 7 do not interfere with each other when rotating.

FIG. 4 shows two view ports 13. Each of the view ports 13 is formed on the front face of the first busbar disconnecting unit 3 and on the front face of the second busbar disconnecting unit 4. The three-position switches 7 are observed as overlapped in the direction of observation; however, because blades 7a of the three-position switches 7 rotate in planes parallel to the sheet, open/close states of the blades 7a of the three position switches 7 arranged in three rows in the depth direction can be observed.

FIG. 5 is a top cross-sectional view showing the operation mechanisms of the three-position switches 7 observed from the top thereof. It shows that the first busbar disconnecting unit 3 on the front side is connected to a three-position switch operation mechanism 8 by an operation shaft 7d, and the second busbar disconnecting unit 4 on the rear side is connected to a three-position switch operation mechanism 8 by an operation shaft 7e.

Three-phase three-position switches 7 are arranged in a depth direction of the unit, and planes of rotation of the blades 7a of the three-position switches 7 are set to be planes orthogonal to a direction from the front side to the rear side of the switchgear 1, that is, planes parallel to the front face of the switchgear 1. As a result, a blade 7a of a three position switch 7 moves without interfering with adjacent ones. This reduces intervals between three-position switches 7, enabling downsizing of the first busbar disconnecting unit 3 and the second busbar disconnecting unit 4, which are provided with the three-phase three-position switches 7.

The planes of rotation of the blades 7a of the three-position switches 7 are set to be planes parallel to the front face of the switchgear 1. Viewed from the front of the switchgear 1, the first busbar disconnecting unit 3 and the second busbar disconnecting unit 4 are arranged right and left, and inside the first busbar disconnecting unit 3 and the second busbar disconnecting unit 4, three-phase three-position switches 7 are arranged in the depth direction of the switchgear 1. Also, the first busbar disconnecting unit 3 is disposed on the front side and the second busbar disconnecting unit 4 is disposed on the rear side; that is, the first busbar disconnecting unit 3 and the second busbar disconnecting unit 4 are disposed in such a way that they do not look overlapped when observed from the front side and a lateral side of the switchgear 1.

In a case where view ports 13 are formed on side faces of the first busbar disconnecting unit 3 and the second busbar disconnecting unit 4 for observing motions of the blades 7a, the switches 7 with the blades 7a can be observed because they are arranged along a side face of the switchgear 1. However, because the planes of rotation of the blades 7a are planes parallel to the front face of the switchgear 1, that is, planes orthogonal to side faces of the switchgear, it is difficult to observe the motions of the blades 7a through the view ports formed on the side faces of the units.

On the other hand, in a case where the view ports 13 are formed on faces of the first busbar disconnecting unit 3 and the second busbar disconnecting unit 4, the faces being on the front side of the switchgear 1, the three-phase three-position switches 7 look overlapped. However, because the blades 7a rotate clockwise or counterclockwise in planes parallel to the front face of the switchgear 1, the detailed motions of the blades 7a can be observed.

Thus, the switchgear 1, in which the first busbar disconnecting unit 3 and the second busbar disconnecting unit 4 provided with the three-phase three-position switches 7 are disposed as above, enables downsizing of the first busbar disconnecting unit 3 and the second busbar disconnecting unit 4. In addition, formation of the view ports 13 for observing the blades 7a on the front side of the switchgear 1 provides favorable observation condition that allows operations of the switchgear 1 and motion observation to be performed from the same side.

Thus, regarding spaces for operation and observation around the switchgear 1, only a front space needs to be allocated. This eliminates the need for allocating extra spaces around the switchgear 1, allowing its installation in a narrow place.

In this embodiment, the switch housing, in which switches are disposed to constitute a disconnecting unit, is used to prevent operators from contacting the switches or the like. A switch housing made of a highly sealed tank and filled with an insulating gas can also be used for a gas insulated switchgear. In this case, the view port also needs to be an airtight view port.

In this embodiment, a circuit breaker housing, in which circuit breakers are disposed to constitute the circuit breaker unit 2, is used to prevent operators from contacting the circuit breakers or the like. A circuit breaker housing made of a highly sealed tank and filled with an insulating gas can also be used. With these components, a gas-insulated switchgear can be configured.

Embodiment 2

Figure 6:
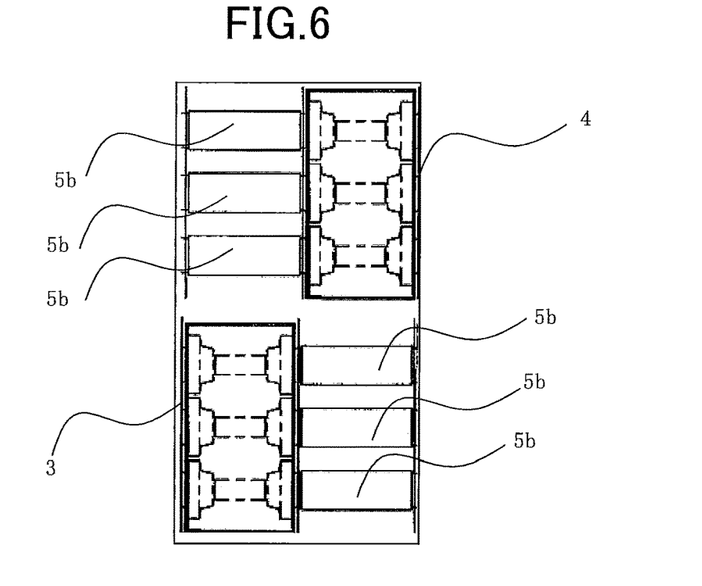
FIG. 6 is a top cross-sectional view of busbar connection parts of a switchgear according to Embodiment 2 of the invention.
Figure 7:
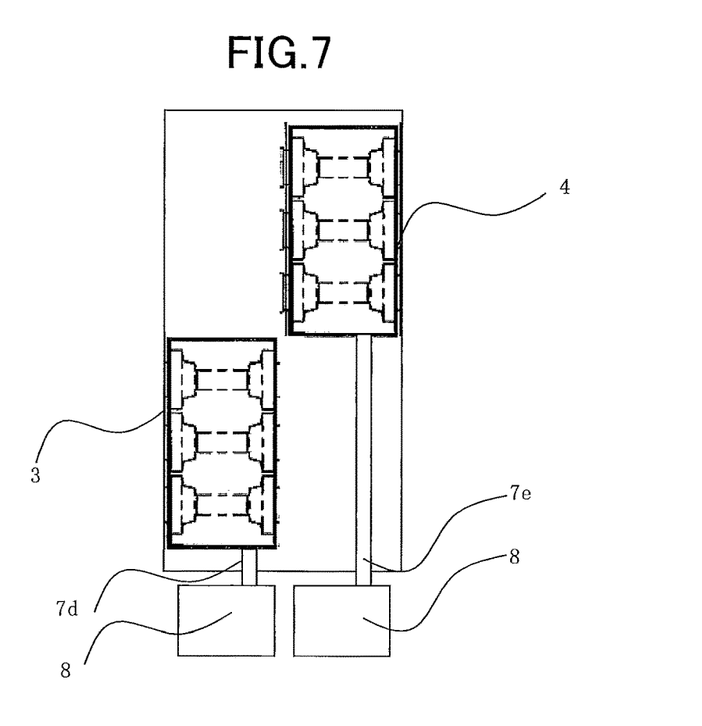
FIG. 7 is a top cross-sectional view showing operation mechanisms of switches of the switchgear according to Embodiment 2 of the invention.

A switchgear 1 according to Embodiment 2 of the present invention is explained with reference to FIGS. 6 and 7. FIG. 6 is a top cross-sectional view of the switchgear 1 according to Embodiment 2, illustrating busbar connection parts 5b observed from the top of the switchgear 1 having a double busbar configuration. FIG. 7 is a top cross-sectional view of the switchgear 1 according to Embodiment 2, illustrating operation mechanisms of three-position switches 7 observed from the top of the switchgear 1 having a double busbar configuration.

In Embodiment 1, a first busbar disconnecting unit 3 is disposed on the front right side as viewed from the front face of a switchgear 1, and a second busbar disconnecting unit 4 is disposed on the rear left side as viewed from the front face of the switchgear 1. Different form Embodiment 1, in the current embodiment, the first busbar disconnecting unit 3 is disposed on the front left side of the switchgear 1, and the second busbar disconnecting unit 4 is disposed on the rear right side of the switchgear 1.

Except for the above, the configuration of the switchgear 1 according to Embodiment 2 is the same as that of the switchgear 1 according to Embodiment 1. In the switchgear 1 according to Embodiment 2, no interference between blades 7a occur in three-position switches 7 of the first busbar disconnecting unit 3 or in the three-position switches 7 of the second busbar disconnecting unit 4. This enables downsizing of the first busbar disconnecting unit 3 and the second busbar disconnecting unit 4.

In addition, both units are operable from the front side of the switchgear 1, and with view ports 13 installed in positions that allow observation from the front side, positions of the blades 7a of the three-position switches 7 can be visually observed from the front face of the switchgear 1 through the airtight view ports 13.

Thus, the switchgear 1, in which the first busbar disconnecting unit 3 and the second busbar disconnecting unit 4 provided with the three-phase three-position switches 7 are disposed as above, enables downsizing of the first busbar disconnecting unit 3 and the second busbar disconnecting unit 4. Also, formation of the view ports for observing the blades 7a on the front side of the switchgear 1 provides favorable observation condition that allows operations of the switchgear 1 and motion observation to be performed from the same side. Thus, regarding spaces for operation and observation around the switchgear 1, only a front space needs to be allocated, allowing installation of the switchgear in a narrow place.

Embodiment 3

Figure 8:
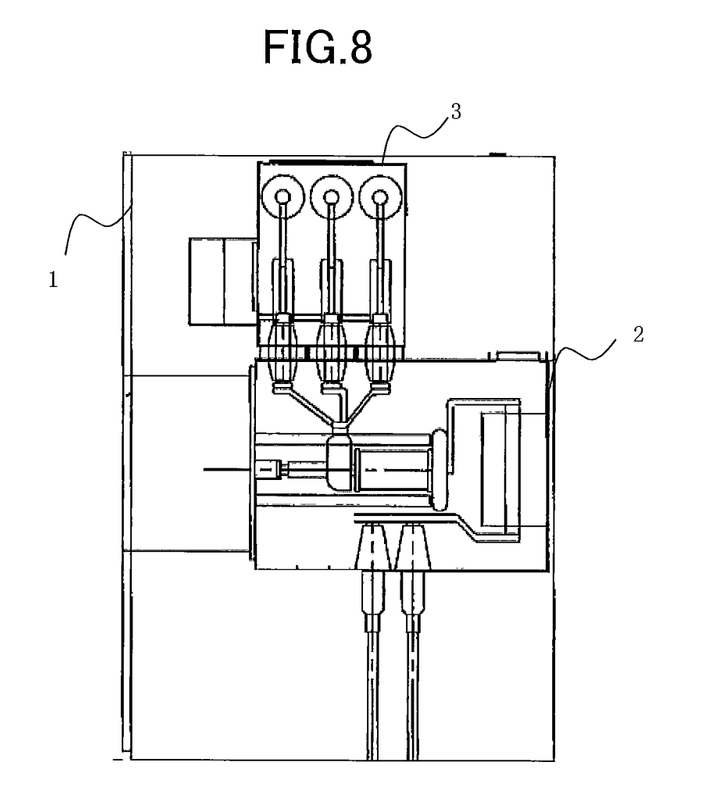
FIG. 8 is a side cross-sectional view of a switchgear according to Embodiment 3 of the invention.

A switchgear 1 according to Embodiment 3 of the invention is explained with reference to FIG. 8. FIG. 8 is a side cross-sectional view of the switchgear 1 according to Embodiment 3 of the invention. The switchgear 1 shown in Embodiment 2 has a double busbar configuration, but the switchgear 1 shown in Embodiment 3 has a single busbar configuration; this is a difference between the two.

Because the switchgear 1 according to the embodiment has the single busbar configuration, only a first busbar disconnecting unit 3 is disposed. The internal structure of the first busbar disconnecting unit 3 is the same as those in Embodiments 1 and 2, and in the first busbar disconnecting unit 3, three three-position switches 7 for respective three phases are provided.

Regarding each of the three-position switches 7, the three-position switches 7 are arranged in a direction perpendicular to the planes of rotation of blades 7a; thus, no interference occurs between the blades 7a and the three-position switches 7, and this enables downsizing of the first busbar disconnecting unit 3.

The three-position switches 7 in the first busbar disconnecting unit 3 are arranged rearward from the front side of the switchgear 1. This enables observation of the rotations of the blades 7a thorough an airtight view port formed on the front face of the first busbar disconnecting unit 3. Since the view port needs be formed only on the front face, the switchgear can be installed in a narrow place.

Embodiment 4

Figure 9:
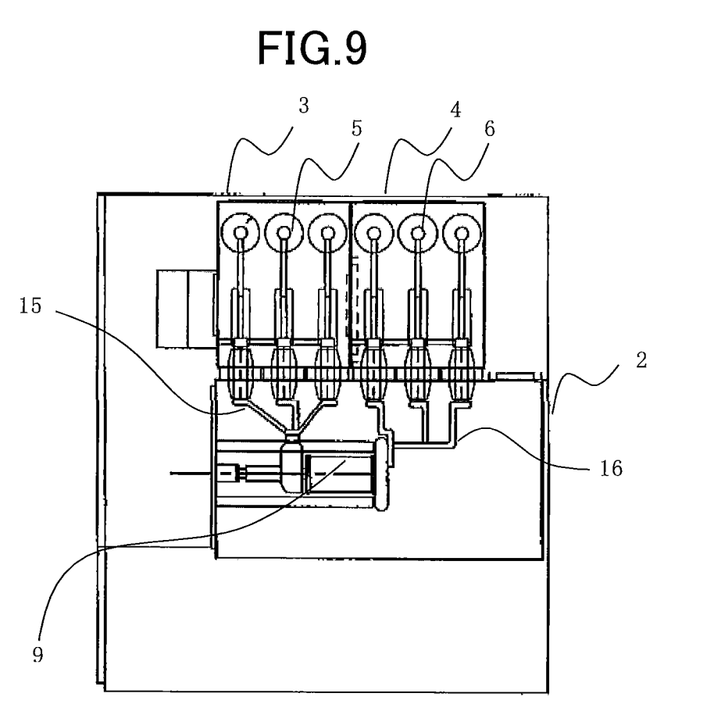
FIG. 9 is a side cross-sectional view of a configuration of a switchgear according to Embodiment 4 of the invention.

A switchgear 1 according to Embodiment 4 of the invention is explained with reference to FIG. 9. FIG. 9 is a side cross-sectional view of the switchgear 1 according to Embodiment 4 of the invention. The switchgear 1 having a double busbar structure is similar in configuration to that according to Embodiment 1, except that it has a configuration sectioning busbars by circuit breakers.

The left side of the figure indicates the front side of the switchgear 1, and similar to FIG. 5, the first busbar disconnecting unit 3 shown on the left side in the present figure is disposed on the front right side of the switchgear as viewed from its front side. The second busbar disconnecting unit 4 shown on the right side in the figure is disposed on the rear left side of the switchgear as viewed from its front side.

In the circuit breaker unit 2, conductors 15 connected to the first busbar disconnecting unit 3 are connected to movable sides of circuit breakers 9, and conductors 16 connected to the second busbar disconnecting unit 4 are connected to fixed sides of the circuit breakers 9. The switchgear 1, whose side cross-sectional view is shown in FIG. 9, switches paths from first busbars 5 to second busbars 6, sections (connects and disconnects) the busbars, and disposes these components in one unit of the switchgear.

According to Embodiment 4 of the invention, similar to Embodiment 1, the switchgear 1 is enabled to be downsized and installed in a narrow space.

REFERENCE NUMERALS

1: switchgear, 2: circuit breaker unit, 3: first busbar disconnecting unit,
4: second busbar disconnecting unit, 5: first busbar,
5a: busbar, 5b: busbar connection part, 6: second busbar,
7: three-position switch, 7a: three-position switch blade,
7b: connection terminal, 7c: earthing terminal,
7d: operation shaft for three-position switch of first busbar disconnecting unit,
7e: operation shaft for three-position switch of second busbar disconnecting unit,
8: operation mechanism for three-position switch of busbar disconnecting unit,
9: circuit breaker, 10: circuit breaker operation mechanism,
11: current transformer, 12: power cable, 13: view port,
14: partition bushing, 15, 15a, 15b, 15c, 16: conductor,

The invention claimed is:

1. A switchgear comprising one or more disconnecting units,
the one or more disconnecting units each comprising:
multiple switches to switch electrical paths by rotation of blades; and
a switch housing having a view port, and including the switches arranged therein, wherein
a plane of rotation of each of the blades and an arrangement direction of the switches intersect,
the switches are arranged to be aligned with each other consecutively rearward from the view port, and
the blades of each of the multiple switches are individually visible through the view port.

2. The switchgear according to claim 1, wherein the switchgear has a double busbar structure,
one of the one or more disconnecting units is a first busbar disconnecting unit to switch a first busbar,
another of the one or more disconnecting units is a second busbar disconnecting unit to switch a second busbar, and
both the first busbar disconnecting unit and the second busbar disconnecting unit are visible when observed from a front side of the switchgear.

3. A switchgear comprising:
a circuit breaker unit including a circuit breaker housing in which circuit breakers are arranged; and
disconnecting units,
the switchgear having a double busbar structure,
the disconnecting units each comprising:
multiple switches to switch electrical paths by rotation of blades; and
a switch housing including the switches arranged therein; wherein
a view port is arranged on a front side of the switch housing and a view port is arranged on a rear side of the switch housing,
a plane of rotation of each of the blades and an arrangement direction of the switches intersect,
the switches are arranged to be aligned with each other consecutively rearward from each of the view ports,
one of the disconnecting units is a first busbar disconnecting unit to switch a first busbar,
another of the disconnecting units is a second busbar disconnecting unit to switch a second busbar, and
both the first busbar disconnecting unit and the second busbar disconnecting unit are visible when observed from the front side view port and the rear side view port.

4. The switchgear according to claim 2, further comprising a circuit breaker unit including a circuit breaker housing in which circuit breakers are arranged, wherein
a plurality of the view ports constituting the disconnecting units face a front side or a rear side of the switch housing, and
each of the disconnecting units is disposed above or below the circuit breaker unit.

5. The switchgear according to claim 3, wherein
each of the disconnecting units is disposed above or below the circuit breaker unit.

6. The switchgear according to claim 4, wherein
viewed from above the switchgear, the first busbar disconnecting unit is disposed on a front right side of the circuit breaker unit, and the second busbar disconnecting unit is disposed on a rear left side of the circuit breaker unit.

7. The switchgear according to claim 4, wherein
viewed from above the switchgear, the first busbar disconnecting unit is disposed on a front left side of the circuit breaker unit, and the second busbar disconnecting unit is disposed on a rear right side of the circuit breaker unit.

8. The switchgear according to claim 4, wherein the first busbar disconnecting unit and the second busbar disconnecting unit are controlled from a front side of the circuit breaker unit.

9. The switchgear according to claim 1, wherein the switchgear includes one of the one or more disconnecting units, and has a single busbar structure.

10. The switchgear according to claim 4, wherein
conductors of the first busbar disconnecting unit are connected to movable sides of the circuit breakers,
conductors of the second busbar disconnecting unit are connected to fixed sides of the circuit breakers, and
the busbars are sectioned by the circuit breakers in one unit of the switchgear.

11. The switchgear according to claim 5, wherein
viewed from above the switchgear, the first busbar disconnecting unit is disposed on a front right side of the circuit breaker unit, and the second busbar disconnecting unit is disposed on a rear left side of the circuit breaker unit.

12. The switchgear according to claim 5, wherein
viewed from above the switchgear, the first busbar disconnecting unit is disposed on a front left side of the circuit breaker unit, and the second busbar disconnecting unit is disposed on a rear right side of the circuit breaker unit.

13. The switchgear according to claim 5, wherein the first busbar disconnecting unit and the second busbar disconnecting unit are controlled from a front side of the circuit breaker unit.

14. The switchgear according to claim 5, wherein
conductors of the first busbar disconnecting unit are connected to movable sides of the circuit breakers,
conductors of the second busbar disconnecting unit are connected to fixed sides of the circuit breakers, and
the busbars are sectioned by the circuit breakers in one circuit breaker unit of the switchgear.

15. The switchgear according to claim 1, wherein a rotational direction of the blades observed through the view port of each of the one or more disconnecting units is clockwise or counterclockwise.

16. The switchgear according to claim 1, wherein the switch housing of each of the one or more disconnecting units is a tank filled with an insulating gas inside thereof.

17. The switchgear according to claim 4, wherein the circuit breaker housing is a tank filled with an insulating gas inside thereof.

* * * * *